June 10, 1947. F. Z. FOUSE 2,421,874
DISCHARGE TABLE
Filed June 28, 1943 6 Sheets-Sheet 1

INVENTOR.
Frederick Z. Fouse.
BY Corbett, Mahoney & Miller
ATTORNEYS

June 10, 1947.  F. Z. FOUSE  2,421,874
DISCHARGE TABLE
Filed June 28, 1943  6 Sheets-Sheet 4

INVENTOR.
Frederick Z. Fouse.
BY Corbett, Mahoney + Miller
ATTORNEYS

June 10, 1947.  F. Z. FOUSE  2,421,874
DISCHARGE TABLE
Filed June 28, 1943  6 Sheets-Sheet 5

INVENTOR.
Frederick Z. Fouse
BY Corbett, Mahoney & Miller
ATTORNEYS

Patented June 10, 1947

2,421,874

UNITED STATES PATENT OFFICE 2,421,874

DISCHARGE TABLE

Frederick Z. Fouse, Lancaster, Ohio, assignor to Anchor Hocking Glass Corporation, Lancaster, Ohio, a corporation of Delaware Application June 28, 1943, Serial No. 492,544

5 Claims. (Cl. 271—69)

My present invention relates to discharge tables. It has to do with the handling or conveying of articles issuing successively from the discharge end of a machine such, for example, as a combined slotting and printing machine used in the manufacture of corrugated paper or fiber boxes or containers. It may, however, be used successfully with any other type of machine which performs operations, such as painting, coating, or printing upon sheet-like relatively stiff articles of various sizes. It is equally well adapted for use with stiff paper, corrugated board, cardboard, fiber or metal sheets, such as lacquer coated tin sheets.

In accordance with present practice, a receiving platform or table is positioned at the discharge end of a printing and slotting machine or the like to catch or receive the rapidly issuing printed or coated sheet-like articles from the machine. Since these articles issue in rapid succession, they slide over one another and thus smear the newly printed and still wet surfaces of the articles. This is, of course, undesirable since in some instances at least, the printed matter or coated portions thereof are smeared or rubbed to such an extent as to be partially or completely obliterated.

One of the objects of my present invention is to provide an improved so-called discharge table which is capable of automatically receiving, handling and stacking a plurality or succession of printed, painted or otherwise coated articles issuing from a machine in single or multiple rows without smearing or otherwise marring the printed or coated matter thereon; another object being to provide such table or apparatus with movable means traveling at a greater rate of speed than the rate of discharge of the articles from the machine to prevent said articles from coming into contact with one another as they issue from the machine.

Another object of my invention is to provide an improved discharge table or apparatus of the foregoing character for use with machines for printing or coating and/or scoring, slotting or cutting sheet-like articles of various sizes and formed from various materials in which the table is adjustable transversely to meet these conditions; and one in which the table is capable of being raised and/or lowered at its article-receiving end.

Another object of my invention is to provide an improved discharge table having mechanism which receives its power from the printing or other type of machine with which it is associated, capable of receiving and conveying successive articles arranged in a flatwise manner, elevating or lifting said articles in substantially fan-shaped relation, depositing the successive articles upon the table in edgewise relation and in upright position and progressively moving the stack of articles away from the conveying and elevating mechanism.

A further object of my invention is to provide an improved discharge table of the foregoing character whose conveying and elevating mechanism is so constructed and arranged as to maintain the successive articles out of contact with each other until they are stacked edgewise, thus allowing the ink, paint, lacquer or other coating material which has been applied to the articles a chance to dry or set.

Another object of my invention is to provide an improved discharge table which receives articles issuing from the machine in flatwise relation and which transfers them successively from said flatwise position to an edgewise position; and one in which the means for transferring the articles from their flatwise position to their edgewise position likewise serves to progressively move or shift the stack while the articles of the stack remain in edgewise position.

A further object of my invention is to provide an improved discharge table in which the means for moving or conveying the issuing articles in flatwise position operates at a somewhat faster speed than the speed of operation of the means or conveyer which shifts the articles from their flatwise position to their stacked edgewise position.

Another object of my invention is to provide an improved discharge table in which a substantially horizontally disposed endless conveyer is arranged in association with a rotatable conveyer or transfer means for removing articles from the endless conveyer, in which the rate of rotation of the rotatable conveyer or transfer means is somewhat slower than the speed of travel or movement of the endless conveyer, and in which the rotatable conveyer means is capable of being driven at variable speeds.

Another object of my invention is to provide an improved discharge table of the foregoing character with a movable stack support for supporting a plurality of relatively flat articles arranged on edge, in which the stack support is caused to move, progressively, by pressure applied thereto through the successive articles as they are added to the stack.

Generally speaking the discharge table or apparatus of my present invention includes a base or supporting structure for supporting the table adjacent the discharge or exit end of a printing and slotting machine, or the like, a substantially horizontal table portion, an endless conveyer including a plurality of endless belts for receiving articles in flatwise relation as they issue from the machine, and a rotary conveyer associated with and disposed between the belts or endless conveyer and said table portion. The rotary conveyer has means or members for receiving the leading or advance edges of the articles and for elevating or lifting said articles from the endless conveyer in spaced, substantially fan-shaped relation and placing them on their edges and in upright position on the table portion or flat surface of the discharge table where they contact a movable stack support. The stack support is progressively shifted away from the rotatable conveyer by the application of pressure applied by said conveyer through the medium of each successive article as it is added to the stack. Moreover, the discharge table is capable of being elevated at its receiving end to permit access to the discharge end of the machine with which it is associated. In addition, the discharge table is provided with means for adjusting or enlarging it in width, or transversely, to accommodate the table for use with a machine capable of discharging relatively flat, sheet-like articles of various sizes.

The foregoing and other objects and advantages of my invention will appear from the following description and appended claims when considered in connection with the accompanying drawings forming a part of this specification, wherein like reference characters designate corresponding parts in the several views.

Figure 1:
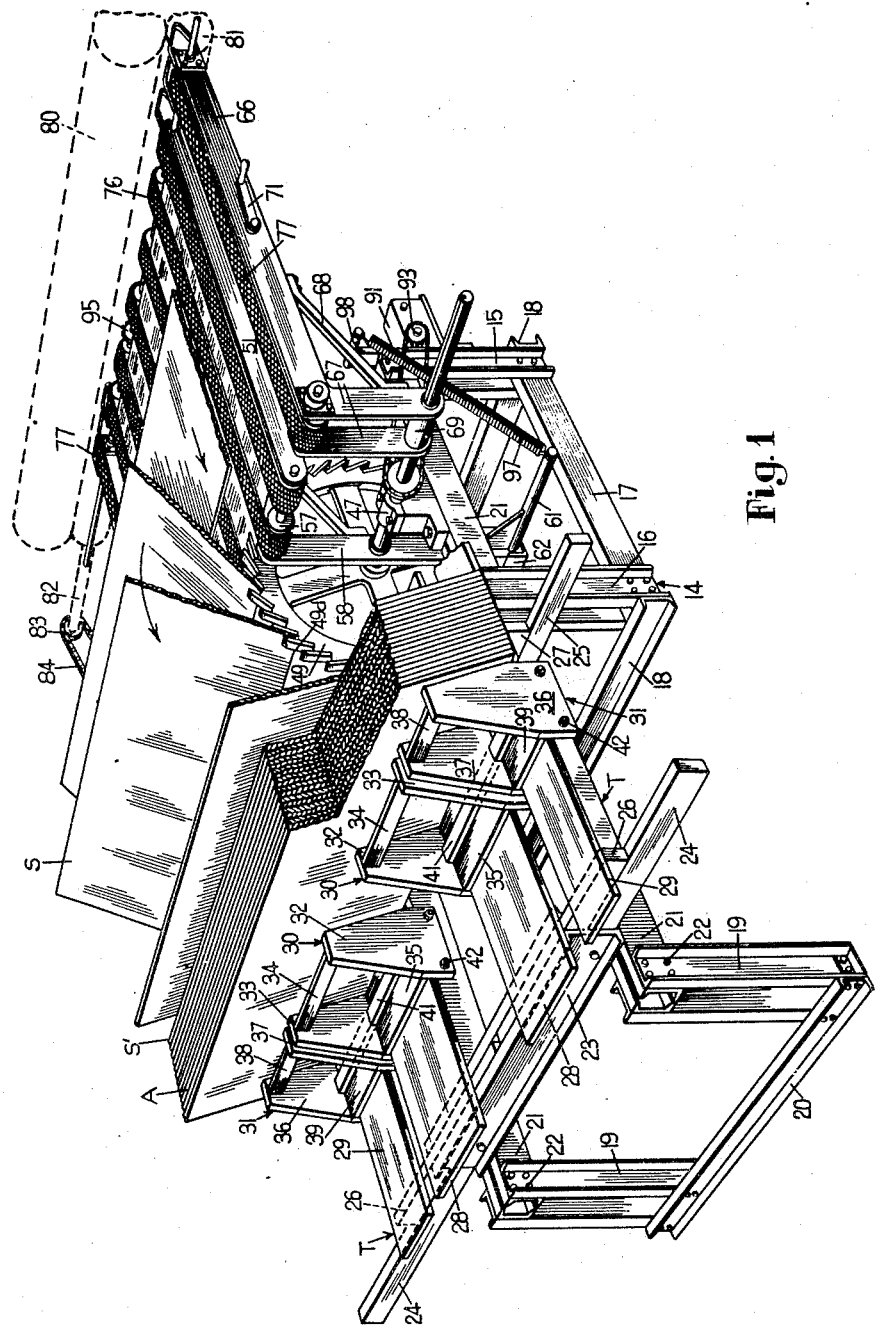
Figure 1 is a perspective view of the improved discharge table of my invention.

Referring now to the drawings and particularly to Figures 1 to 4, inclusive, the improved discharge table or apparatus of my invention is provided with a base or supporting structure shown as a whole at 14. The base, as shown, comprises a pair of transversely spaced front legs 15, a pair of similarly spaced intermediate legs 16 and a pair of transversely spaced rear legs 19. As shown, each of these legs is formed from a pair of channels. The front and intermediate legs 15 and 16 at each side of the structure are connected together by a longitudinally extending base member or channel 17 and the front pair of legs 15 are interconnected by a transverse channel member 18. The intermediate legs 16 are also interconnected by a similar transverse channel member 18. The rear legs 19 are connected together at their lower ends by a transverse base member or channel 20.

The table portion or platform, shown as a whole at T, which is intended to receive and support stacked articles is mounted upon and supported by a pair of transversely spaced longitudinally extending beams or supporting members 21 which are attached to the upper end portions of the legs 15, 16 and 19 at opposite sides of the structure. As shown, each of the beams 21 comprises a pair of longitudinal channel members whose flanges are in opposed relation and are disposed between the channel members which form the supporting legs, being secured to said channel members by means of bolts or the like 22.

The table portion or platform unit T comprises two pairs of transversely extending channel members or supports 23. One pair of these channel members is mounted upon the beams 21 adjacent the rear legs 19 and the other pair is similarly mounted adjacent the intermediate legs 16. As clearly seen Figs. 1 and 2 the channel members 23 of each pair are mounted upon the beams 21 in spaced relation. Located within the space between the rear pair of channels 23 is a transversely extending wood bar or member 24 which is of greater length than the channels 23 and is secured in place between the channels by means of bolts or the like 23a. A pair of slidable wood bars or members 26 is mounted upon the bar 24 within the space between the channels 23 and these members 26 are free to slide relative to the bar 24 and the channels.

A bar 25 similar to the bar 24 is disposed between the channel members 23 which are located adjacent the intermediate legs 16 and is secured in place between the channels by means of bolts or the like 23a. A pair of bars or wood members 27, similar to the bars 26, is located in the space between the channels 23. The bars 27 are adapted to slide longitudinally on and relative to the bar 25.

The top surface of the table or platform unit T, as shown, comprises a pair of inner transversely spaced longitudinally extending boards or plates 28 mounted upon the spaced pairs of channels 23 in fixed relation with respect to said channels. The table or platform also comprises a pair of outer transversely spaced longitudinally extending boards or plates 29 whch are secured to the top edges at the outer end portions of the slidable pairs of bars 26 and 27. It will be understood that the boards 28 are fixed and remain in the positions in which they are shown in Figure 1, whereas the outside boards 29, secured to the slidable bars 26 and 27, can be moved outwardly in transverse directions away from the boards or platform members 28. Thus, it will be seen that the table or platform may be adjusted in width transversely of the structure so as to accommodate the apparatus for use with stacked articles of various lengths and sizes. The pairs of channels 23 and the transverse bars 24 and 25 serve as trackways or guides for the pairs of bars 26 and 27 when the table or platform is being adjusted to different widths.

Referring now particularly to Figures 1, 2, 8 and 9, it will be seen that the table portion or platform T is provided with a longitudinally movable, as well as a transversely adjustable stack support for supporting a stack A of sheet-like articles on edge and in upright position.

The stack support, as shown, comprises four sections or parts including a pair of inside or intermediate like sections 30 and a pair of end or outside like sections 31. The sections 30 are mounted for longitudinal movement on the boards or plates 28. The sections 31 are likewise mounted for longitudinal movement on the boards or plates 29 and the sections 31 are also capable of lateral movement with their supporting boards 29 away from the intermediate stack supporting sections 30.

Each of the inside sections 30 comprises a pair of spaced upright end walls 32 and 33 secured together at their upper ends by a strut or member 34 and at their lower ends by a bottom plate or board 35.

Each of the outer stack support sections 31 comprises upright end walls 36 and 37 which are secured together in spaced relation at their upper ends by a strut or member 38 and adjacent their lower ends by a bottom wall or plate 39. The inner adjacent end walls 33 and 37 of the sections 30 and 31 are provided with aligned notches or openings 40 through which extends a guide bar or member 41. This member 41 is secured to the bottom wall or base portion 39 of the section 31 but is free to slide in the notches 40 and over the base or bottom 35 of the adjacent section 30 when the section 31 is moved transversely relative to the section 30. The guide bar 41 also serves to tie the sections 30 and 31 together as a unit so that these sections will move together during their longitudinal travel or movement over the platform members or boards 28 and 29. The end walls of each section are further secured together by means of a pair of rods or bolts 42 each of which is provided with a friction-reducing sleeve 43 which contacts the bottom face of the platform member upon which the section is mounted so as to facilitate the longitudinal movement of the section on its supporting platform or table member.

Figure 2:
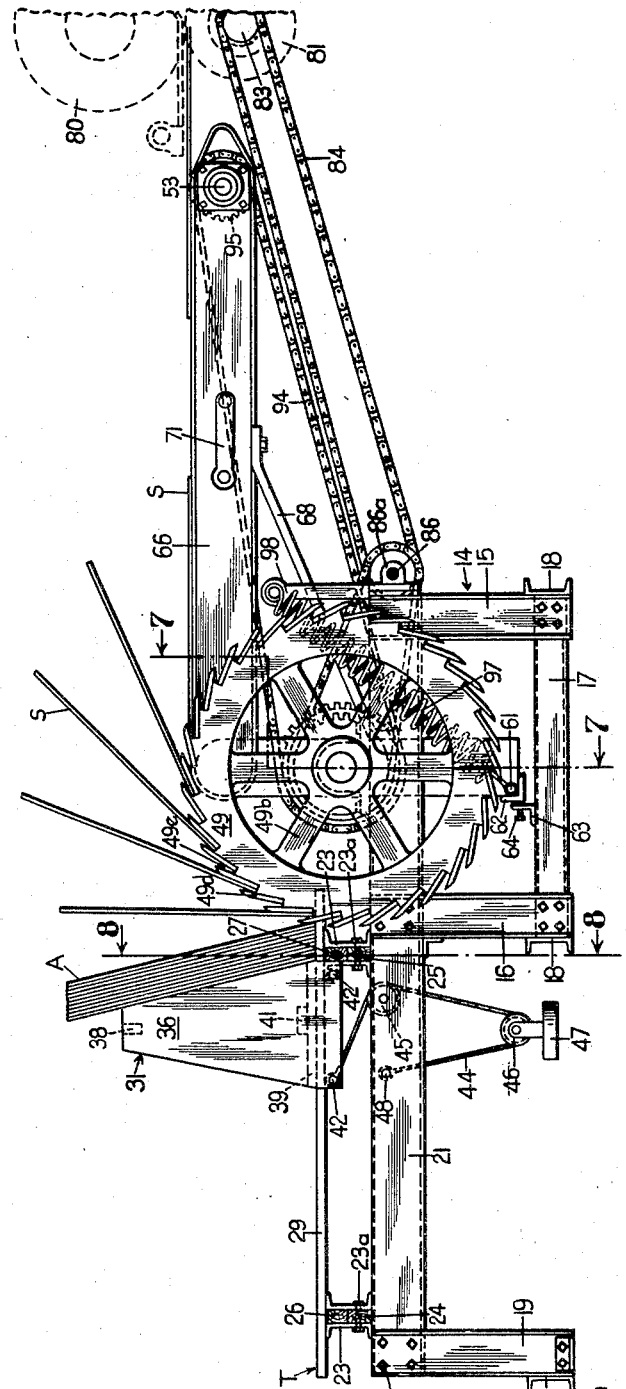
Figure 2 is a side elevational view of the same.

Each pair of sections 30 and 31 is provided with means tending to maintain the pair of sections toward the right of Figure 2. Such means, as shown, comprises a rope or cable 44 provided at one end with a loop 44a which is slipped over the rod or bolt 42. This cable 44 is passed around an idler pulley or roller 45 which is secured to the longitudinal member or beam 21 and extends through a pulley 46 carrying a weight 47, the opposite end of the cable being secured at 48 to the beam 21 in spaced relation and to the left of the idler pulley 45, see Figure 2. The weighted cable provides a counterweight for the pair of stack-supporting sections or members 30 and 31. It will be noted, see particularly Figures 1 and 2, that the end walls of the sections 30 and 31 are substantially A-shaped thus presenting at their inner or right upright edges as viewed in these figures, upwardly inclined surfaces for supporting the stack A in upright on-edge position.

Figure 3:
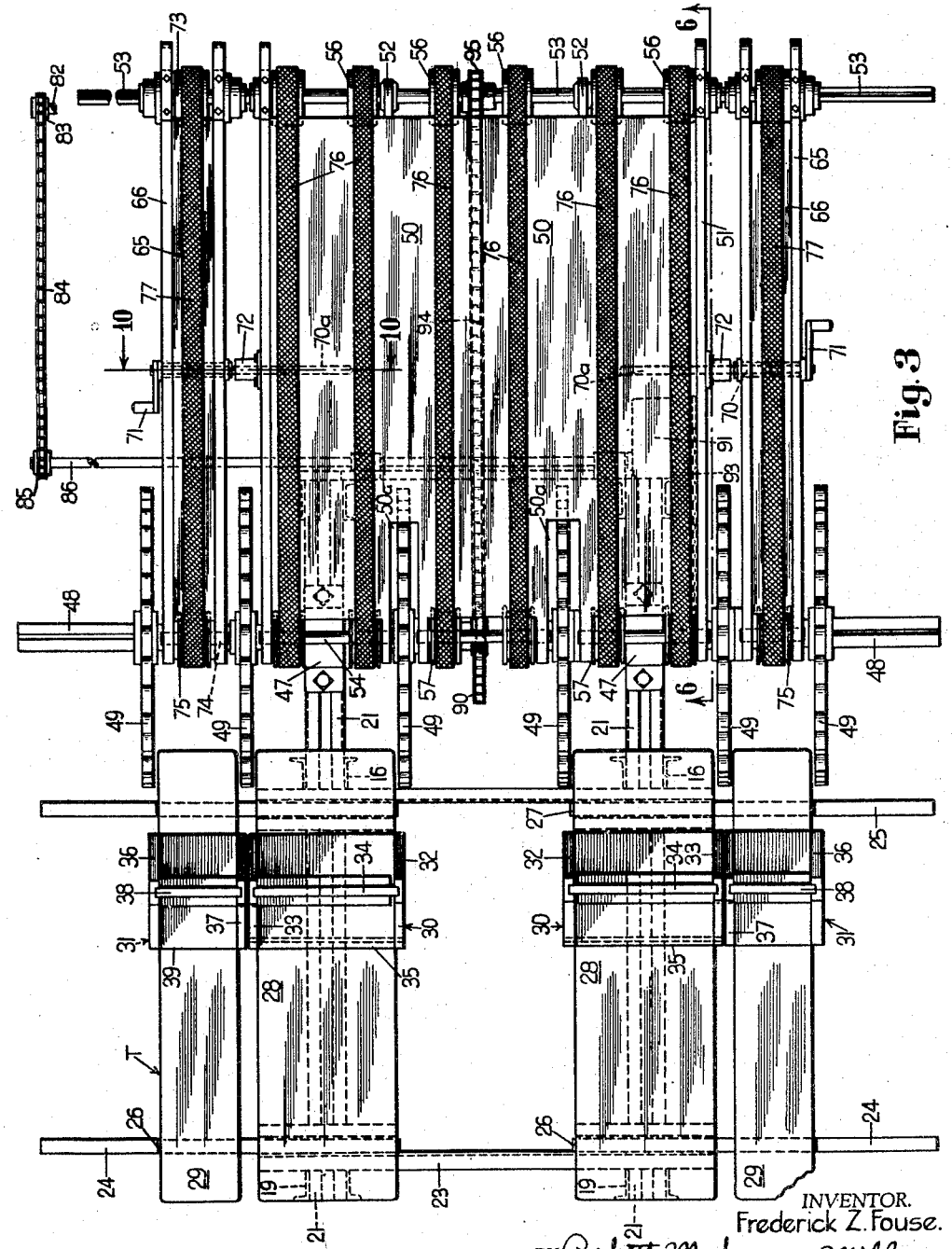
Figure 3 is a top plan view thereof.
Figure 4:
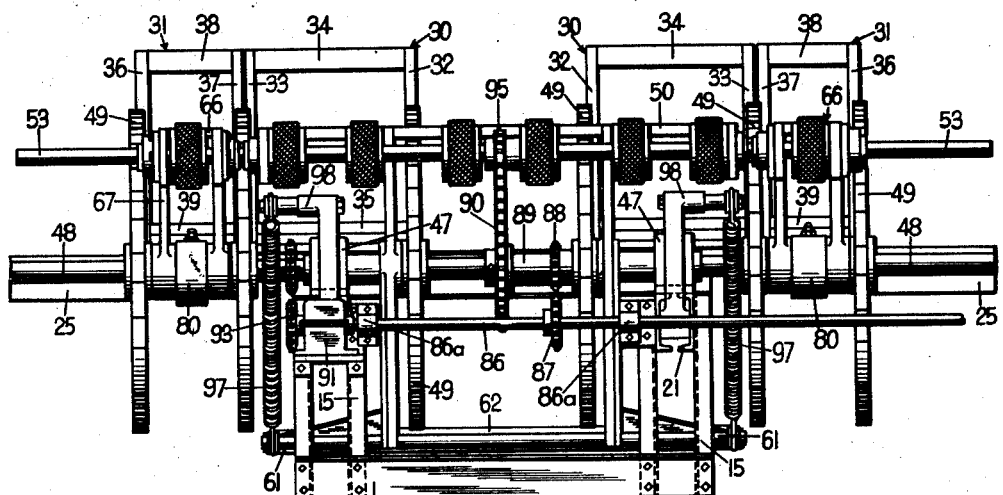
Figure 4 is an end elevational view of the discharge table looking toward the left of Figure 3.

Referring now particularly to Figures 1 and 4, the transversely spaced longitudinally extending beams or members 21 support on their upper edges a pair of similar transversely spaced bearing blocks or members 47 which are secured to the beams 21 in any suitable manner and project upwardly therefrom. These bearings 47 provide means for supporting a transversely extending driven shaft 48 which carries a plurality of transversely spaced rotatable transfer or conveyer wheel-like members 49, six such being shown, see Fig. 3. Each of these members 49 is fixed or keyed to the shaft 48 to rotate therewith. The shaft 48 also carries a plurality of transversely spaced sprockets or gears for driving the conveyer mechanism of the discharge table as will presently be seen.

Figure 5:
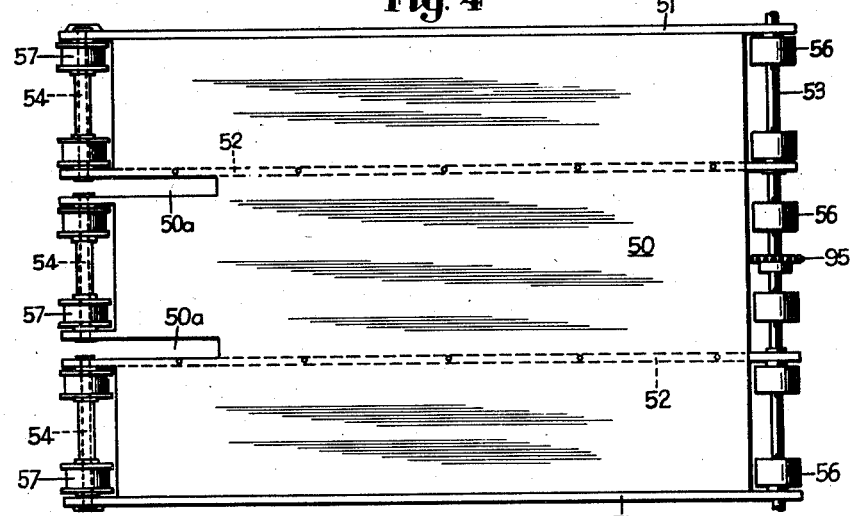
Figure 5 is a top plan view of a portion of the discharge table structure with the endless belts or conveyer removed.
Figure 6:
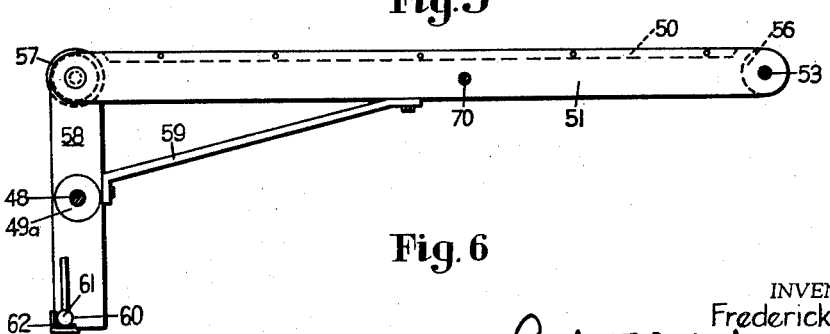
Figure 6 is a side elevation, partly in section, of the structure shown in Figure 5 and taken substantially along the line 6—6 of Figure 3, looking in the direction of the arrows.

The forward or front end, that is the article-receiving end of the discharge table, comprises a centrally disposed table or platform member 50 provided at its inner edge with a pair of spaced slots or notches 50a through which two of the rotary conveyer members 49 pass during operation of the discharge table mechanism. The table 50, as shown, is provided with a pair of side frame members or supports 51 which extend longitudinally of the table and with an intermediate pair of longitudinally extending reinforcing members or braces 52 to which the table or platform portion 50 is attached. The outer ends of the members 51 and 52, that is the ends shown at the right of Figures 5 and 6, provide bearings for a transversely extending driven shaft 53 and the opposite or inner ends of these members provide supporting means or bearings for three axially aligned short shafts 54. The shaft 53 carries at substantially its central portion a sprocket 55 which is fixed to the shaft and a plurality of pairs of drive pulleys 56 which are likewise fixed or keyed to the shaft. Each of the short shafts 54 at the opposite end of the table carries a pair of idler pulleys 57, which pulleys are freely rotatable on the shafts and are disposed opposite the power or driving pulleys 56. The oppositely disposed pulleys 56 and 57 carry endless belts or conveyer members as will be described hereinafter.

The table or platform unit 50 is supported at opposite sides by upright members or legs 58 which are mounted for oscillatable movement on and relative to the shaft 48. Suitable angularly disposed brace members 59 connect the members 58 and 51 to provide a rigid structure. As viewed in Figure 6, the side members 51 and the upright members or legs 58 form a substantially L-shaped frame for the opposite sides of the platform or table unit 50. The lower ends of the legs or members 58 are provided with aligned holes or openings 60 through which a rod 61 extends. The spaced members 58 are secured together at their lower ends by a transversely extending angle bar or member 62, see particularly Figures 1 and 6. As seen in Figure 2, the longitudinally extending base members 17 support a transversely extending angle bar or member 63 whose vertical or upright flange is provided with an adjustable stop screw or member 64 which is adapted to be engaged by the angle 62. This stop member limits the downward movement of the table unit 50. It will be understood that the table 50 may be raised and/or lowered at its outer or forward end, its fulcrum being the shaft 48.

Disposed at opposite sides of the table unit 50 are additional or auxiliary table units 65, one at each side, each of which comprises a relatively narrow table having side longitudinal frame members 66 to which are attached depending leg members 67, one or both of these legs and side members 66 being braced by an angularly disposed brace member 68. The lower ends of the spaced leg members 67 are provided with aligned openings to receive one of the outer ends of the driving shaft 48 and are maintained in spaced relation by a spacer sleeve 69. It will be understood that the auxiliary platforms or table portions 65 are identical at both sides of the central table unit 50 and are adjustable transversely of the discharge table or apparatus relative to the central table 50. It will be seen, Figures 1 and 2, that the table units 50 and 65 are in the same plane and that this plane is at a higher level than the plane of the table or platform unit T.

Figure 10:
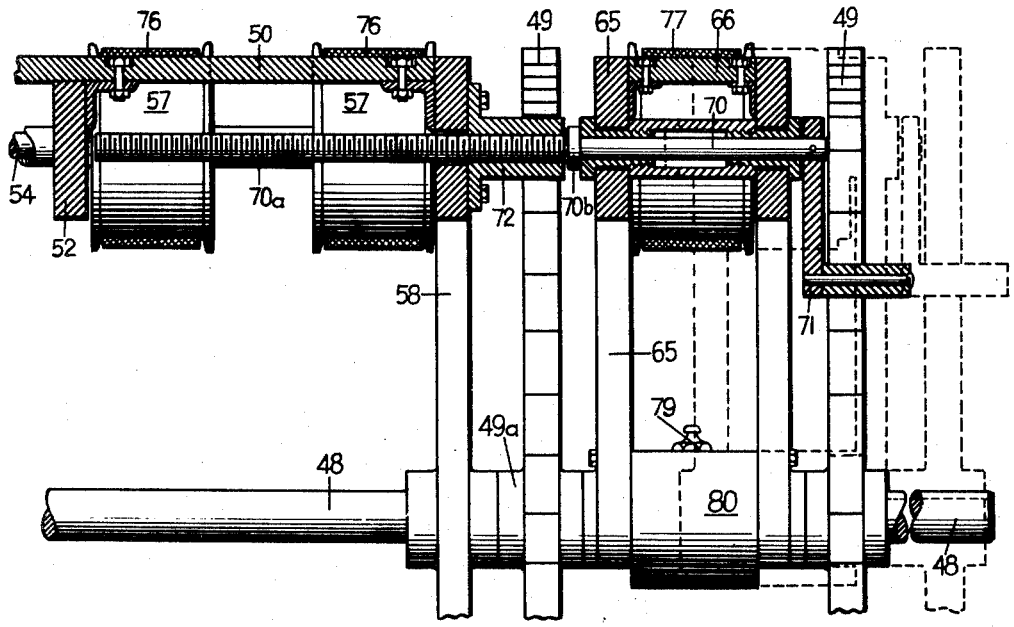
Figure 10 is an enlarged fragmentary detail sectional view taken substantially along the line 10—10 of Figure 3, looking in the direction of the arrows.
Figure 11:
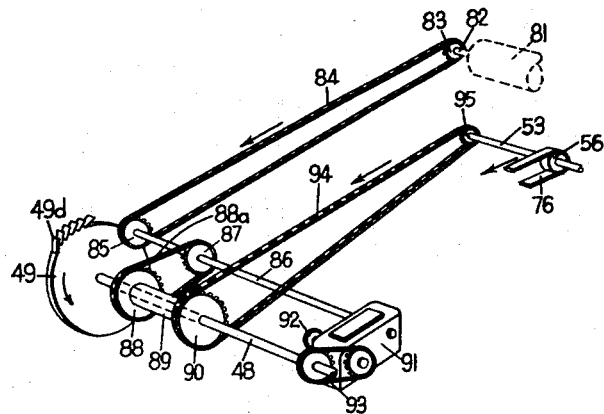
Figure 11 is a fragmentary diagrammatic view, in perspective illustrating the driving connections or mechanism of the invention.

Suitable mechanism is provided for independently adjusting each of the side or auxiliary tables 65 relative to the intermediate table or platform 50. This mechanism is best shown in Figures 3 and 10 and comprises a horizontal shaft having a plain portion 70, an inner threaded end 70a, and a stop member or collar 70b interposed between the plain or unthreaded portion 70 of the shaft and the threaded portion 70a thereof. The shaft 70, 70a, 70b is provided with a crank or handle 71. The unthreaded portion 70 of the shaft extends through suitable bearings formed in the end members 66 and the threaded portion 70a engages the internal threads of a bearing or boss member 72 bolted to the outer face of the side frame member 51 of the table unit 50. It will be seen that the threaded end 70a has a clearance in a hole or opening formed in the member 51. Since the legs 67 are free to slide on the shaft 48 and the end members 66 are likewise free to slide on the shaft 53, by turning the handle 71 and thus rotating the handle shaft 70, 70a in one direction, the auxiliary conveyer table or platform 65 will be caused to move outwardly as a unit away from the table 50. Upon rotation of the handle 71 and the handle shaft in the opposite direction, the auxiliary table 65 will be caused to travel inwardly toward the central table unit 50.

It will be understood that the outer rotatable wheel-like conveyer member 49, being keyed to the shaft 48 for sliding movement thereon, will be moved outwardly with the table unit 65 when said unit travels outwardly transversely of the machine. It may prove desirable to provide a collar and thumb screw unit 48a on the shaft 48 to engage the hub of the member 49 and prevent its unauthorized travel along the shaft. If such be used, the thumb screw will be released to permit the member 49 to travel outwardly with the auxiliary unit 65. When the unit 65 is moved inwardly toward the central table portion 50, the thumb screw can be again released and the member 49 moved inwardly until its hub portion contacts the hub portion of the member 67. It will, of course, be understood that when the auxiliary conveyer units are moved outwardly away from the central table portion 50, that the table or platform members 29 may likewise be moved outwardly a corresponding distance.

The auxiliary unit 65 at each side of the discharge table is provided at its forward end with a driving pulley 73 mounted and keyed upon the shaft 53 and at its inner end with a short shaft 74 which carries an idler pulley 75.

The oppositely disposed driving and idler pulleys 56 and 57, respectively, of the central table section or unit 50 support endless belts 76 whereas the driving and idler pulleys 73 and 75, respectively, of the side or auxiliary conveyer units 65 are provided with similar endless belts 77.

Figure 7:
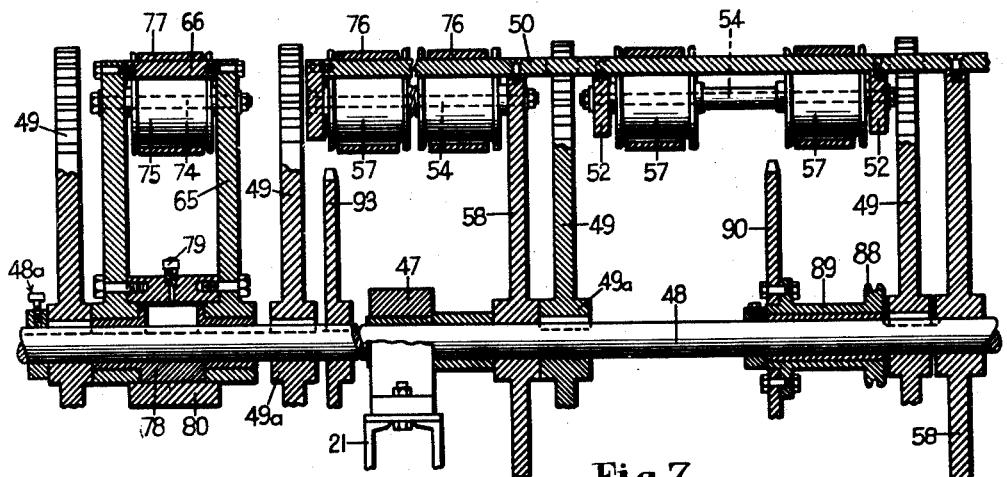
Figure 7 is an enlarged sectional view taken substantially along the line 7—7 of Figure 2, looking in the direction of the arrows.
Figure 8:
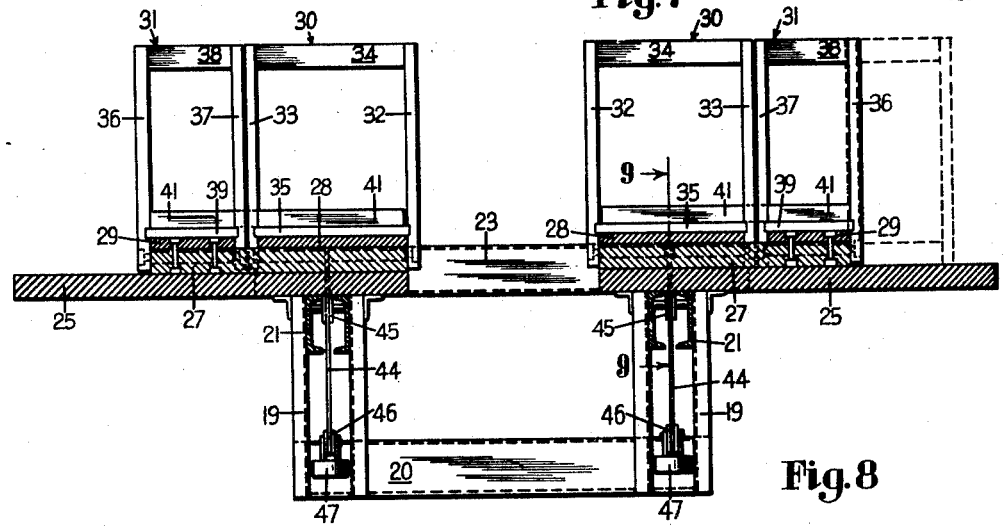
Figure 8 is a vertical sectional view, partly in elevation, taken substantially along the line 8—8 of Figure 2, looking in the direction of the arrows, with the edgewise stacked articles of Figure 2 removed.
Figure 9:
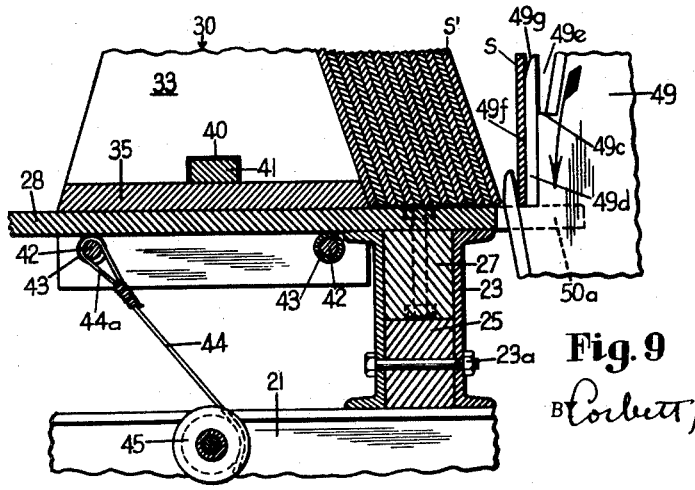
Figure 9 is an enlarged fragmentary detail sectional view taken substantially along the line 9—9 of Figure 8, looking in the direction of the arrows.

By reference to Figure 7 it will be seen that the rotatable transfer or conveyer members 49 are keyed to the driven shaft 48 and that the supporting legs 67 of each of the auxiliary table and endless conveyer units 65, one only being shown, are mounted upon a lubricated bushing 78 which latter is also keyed to shaft 48. Thus, the legs 67 are free to be oscillated upon the bushing 78. Lubricant may be supplied through the tap or fitting 79 which is threaded into a retaining ring or collar 80 bolted to said legs. The shaft 48 is free to rotate without affecting the position of the legs 67 and the remainder of the unit of which they form a part.

Referring now particularly to Figures 1, 2, 3 and 7 of the drawings, the rotatable transfer and conveyer members 49 having hub portions 49a and spokes 49b are, as stated above, disposed in spaced relation transversely of the discharge table and are keyed to the shaft 48. As shown, Figure 3, six such rotatable conveyers 49 are provided, with the two outer end members of the group only being slidable or movable on the shaft 48.

The periphery of each of the members 49 is provided with a series of equidistantly spaced notches or recesses 49c defined by fingers or relatively narrow plate-like members 49d. Each of these fingers 49d is welded, riveted or otherwise secured to the periphery of the member 49 and extends from the base of one of the notches 49c to a point beyond the base of the next notch formed in the periphery. Thus, a substantially V-shaped pocket 49e is provided between the inner end and the spaced outer end, respectivly, of each pair of fingers. It will be noted, see particularly Figure 9, that the outer face of each of the fingers has a straight taper from its base portion to a point adjacent the free edge thereof and a curved taper from this point to the very tip of the finger, the straight taper being indicated at 49f and the curved taper at 49g. The purpose of having these fingers so shaped or formed is to provide them with outer surfaces which contact the articles stacked upon the table or platform members 28 and 29 as the conveyer member 49 travels in its counter-clockwise direction as indicated by the arrow in Figure 9 to effect a camming or pushing action upon the last article S placed edgewise against the stack A and thus move said article and through it all of the articles or sheets in the stack in a direction away from the battery or series of rotatable conveyer members 49. It will be understood that this camming or pushing action against the most recently added article of the stack will move the stack and its stack-supporting units 30 and 31 lengthwise of the boards 28 and 29 against the pressure exerted upon the stack support and the stack of articles by the weights 47. Thus, the stack of articles and the stack support will be moved away from the rotatable conveyer progressively as each successive article S is added to the stack A.

It will be understood that the power for driving the conveyer including the endless belts 76 and 77 and the rotatable conveyer composed of the six wheel-like pocketed members 49 is derived from a driving connection forming a part of the machine with which my discharge table is associated. In this connection reference should be had to Figures 1, 2, 3 and 11. In Figures 1 and 2 the printing and scoring, slotting or cutting rollers, or the like 80 and 81 are shown at the exit end of a machine with which the discharge table is associated. As shown, the lower roll 81 is provided with a shaft extension 82 carrying at its outer end a sprocket 83. This shaft and sprocket are drivingly connected by a sprocket chain 84 to a sprocket 85 carried by a driven shaft 86 mounted in suitable bearings 86a carried by the forward end of the supporting frame structure or base 14 of the discharge table, see Figure 2. Power derived from the driven shaft 86 is transmitted through a sprocket 87 carried thereby to a sprocket 88 mounted upon one end of a rotatable sleeve 89 to whose opposite end is attached a sprocket 90 of somewhat larger diameter than the sprocket 88. The sprockets 87 and 88 are drivingly connected together by a sprocket chain 88a. It will be understood that the shaft 48 which carries the rotatable conveyer members 49 will rotate freely within the sleeve or hub 89 relative to the sprockets 88 and 90.

The sprocket 90 is drivingly connected by a sprocket chain 94 with a relatively small sprocket 95 carried by the shaft 53 upon which the pulleys 56 and 73 are mounted, which pulleys drive the endless conveyer belts 76 and 77, respectively. Since the sprocket 95 is of considerably smaller diameter than the driving sprocket 90, the endless belts 76 and 77 will be driven at a faster rate of speed than that at which the rotary conveyer members 49 are driven. Moreover, the driving speed or travel of the belts 76 and 77 is somewhat faster than the speed of rotation of the discharge rolls 80 and 81 of the printing and slotting, or the like, machine with which the discharge table is associated.

It is desirable to rotate the conveyer members 49 at a somewhat slower peripheral speed than the speed of travel or movement of the endless conveyer comprising the belts 76 and 77 so that the flatwise positioned articles S are driven or moved by the endless conveyer so as to force their leading edges into the successive substantially V-shaped pockets 49e formed in the peripheries of the wheel or disk-like conveyer or transfer members 49.

Moreover, it might prove desirable to drive the rotatable conveyer or transfer members 49 at variable speeds, dependent upon the size of the relatively sheet-like articles being handled by the discharge table. For this purpose I have provided a conventional type of variable speed transmission mechanism, shown as a whole at 91 in Figures 4 and 11 of the drawings. It is to be noted that the shaft 86 is connected with suitable gearing (not shown) of the variable speed mechanism or device and that the driven shaft 48 is connected to the variable speed mechanism by a sprocket and chain device shown as a whole at 93. Thus, the drive is through the sprocket chain 84, shaft 86, variable speed device 91, sprocket and chain device 93, and shaft 48 to the rotatable conveyer or transfer members 49. An adjusting device or control handle or member 92 is provided for the purpose of adjusting or changing the ratio of the gearing within the variable speed device for the purpose of varying or controlling the peripheral speed of the members 49. It will be understood that any conventional type of variable speed mechanism may be employed and that it may be associated in any manner with the means for driving the rotary conveyer or transfer means 49.

As each successive article S which, as stated previously, is of relatively stiff sheet-like character, moves with the endless conveyer toward the rotary conveyer members 49 until its leading edge is moved or driven into contact with the sockets 49e in said members, the rotation of the members 49 serves to lift or elevate the article from the endless conveyer belts 76 and 77 and transfer it from its horizontal position on said belts to an upright edgewise position on the boards or plate members 28 and 29 of the table or platform at the rear end of the discharge table. As seen in Figure 2, successive and spaced notches 49e receive and support the leading edges of the successive articles S and move them in substantially fan-shaped spaced relation toward the platform or table. As the leading edge of each successive article S is carried by the rotary conveyer and is placed in edgewise engagement with the table or platform, the outer tapered face of the leading finger or member 49d of the socket from which the article is released wipes against the adjacent face of the last previously deposited article S' with a camming or pushing action, see Figure 9, to move the stack A of articles and also the stack support away from the rotary conveyer. The next succeeding finger 49 whose outer tapered face is in contact with the article S will perform the same wiping or camming action on that article as the member 49 carries the finger past the article S' just previously deposited on the table. It will be understood that the fingers apply this camming action to each successive article as it is placed edgewise on the table. It will also be understood that as each article is stacked on the table the aligned fingers 49d of all six of the rotary members 49 will perform, simultaneously, a camming, wiping or pushing action upon the newly deposited article. That is to say, the aligned fingers of all of the members 49 which are in contact with the article being deposited will perform this camming application of pressure to the article. The number of fingers in contact depends upon the length of the articles being handled.

As stated previously, the endless conveyer unit which comprises the central section 50 and the endless conveyer sections 65 is mounted for swinging up and down movement on the shaft 48. At times it becomes desirable to service or make adjustments to the rolls 80 and 81 at the exit end of the printing and slotting machine. In such case it is merely necessary to swing the endless conveyer about its fulcrum to elevate the forward end of it to permit access to the mechanism at the exit end of said machine. To counterbalance the weight of the conveyer member during its raising or lowering movements, I have provided the leg members 58 with the transversely extending shaft or rod 61 previously referred to. This shaft extends from one side of the machine to the other and has attached to its opposite ends tension springs 97, see Figure 4. The opposite ends of these tension springs are attached to brackets 98 which are fixed to the front end of the supporting frame structure or base 14. Thus, as the endless conveyer unit or portion of the discharge table is elevated, the springs 97 will be compressed and as it is lowered they will be placed under tension thus permitting the conveyer to be raised and lowered without any particular effort.

As stated above, an adjustable stop member 64 is provided to engage the angle 62 carried by the lower ends of the legs 58 of the endless conveyer unit. It will be understood that this stop limits downward tilting movement of the conveyer unit. In the event it becomes necessary to do so, the adjustable stop may be employed to raise or lower the free or forward end of the endless conveyer unit so as to align it properly with the exit or discharge mouth or opening between the machine rolls 80 and 81.

From the foregoing it will be seen that I have provided an improved discharge table capable of being associated with a machine for discharging relatively stiff sheet-like articles in either single or multiple rows, in which an endless conveyer receives the successive articles in flatwise relation as they issue from the machine, and a rotary conveyer picks up a succession of said articles from the endless conveyer, transfers them in substantially fan-like spaced relation and places them on a table or platform where they are stacked in edgewise upright position to be moved with the stack progressively away from the rotatable transfer or conveyer mechanism. It will also be understood that by maintaining the successive sheets in spaced relation flatwise upon the conveyer and also by elevating and transferring them while maintaining them in spaced fan-like relation from the endless conveyer, any printing or coating on the surfaces of the sheets will be allowed to dry or set prior to their being placed in the stack. In other words, the discharge table of my invention performs in succession and automatically the steps of transporting the printed, coated or painted articles from the machine in flatwise spaced relation, transfers such articles from a flatwise position in spaced fan-shaped relation and places them on edge in upright position on a support and in a progressively moving or advancing stack from which they can be removed at will.

Moreover, it will be understood that I have provided a discharge table and means for operating or driving the rotatable conveyer or transfer means at a somewhat slower peripheral speed than the speed of travel or movement of the endless conveyer unit or units. It will be seen, also, that I have provided an improved discharge table structure in which variable speed transmission mechanism may be incorporated as a part of the drive system whereby to permit the rotatable conveyer or transfer unit or units to be driven at variable speeds and at a different rate of speed from the speed of movement of the endless conveyer unit or units.

Having thus described my invention, what I claim is:

1. In combination with a discharge table structure of the type described having receiving and discharge portions and adapted for association with the discharge end of a machine, in which the table includes a conveyer of the endless belt type for moving a succession of relatively stiff sheet-like articles in flatwise relation away from the discharge end of the machine and wherein the table structure also includes a rotatable conveyer for receiving the leading edges of said articles and elevating them in spaced fan-shaped relation from the endless belts and depositing them in edgewise relation upon the table; of means associated with said structure for adjusting the width of the receiving portion of said table whereby to accommodate articles of different sizes, means permitting the adjustment of the width of the discharge portion of the table, and means also associated with said structure permitting the raising and/or lowering of the receiving end of said table with relation to the discharge portion of a machine with which the discharge table structure is associated.

2. In a discharge table having receiving and discharge portions at different levels and adapted for association with the discharge end of a machine to receive articles from said machine, the combination of a conveyer at the receiving portion of the table comprising a plurality of endless belts for moving a succession of relatively stiff sheet-like articles in flatwise relation away from said machine discharge end, a rotatable conveyer comprising a plurality of spaced wheel-like members associated with said endless belts for receiving the leading edges of said articles and elevating them in spaced fan-shaped relation from the belts and depositing them in edgewise relation upon said table, means for adjusting the width of the receiving portion of the table and the simultaneous adjustment of said endless belts transversely of the table, means permitting the adjustment of the width of the discharge portion of said table, and means permitting the raising and/or lowering of the receiving portion of the table relative to the discharge end of the machine with which it is associated.

3. In a discharge table having receiving and discharge portions and adapted for association with the discharge end of a machine to receive articles from said machine, the combination of a conveyer at the receiving portion of the table comprising a plurality of endless belts for moving a succession of relatively stiff sheet-like articles in a flatwise relation away from said machine discharge end, a rotatable conveyer comprising a plurality of spaced wheel-like members associated with said endless belts for receiving the leading edges of said articles and elevating them in spaced fan-shaped relation from the belts and depositing them in edgewise relation upon said table, means for adjusting the width of the receiving portion of the table and the simultaneous adjustment of said endless belts transversely of the table, means permitting the adjustment of the width of the discharge portion of said table, means permitting the raising and/or lowering of the receiving portion of the table relative to the discharge end of the machine with which it is associated, and variable speed transmission mechanism for driving the first-named conveyer and the rotatable conveyer at different speeds.

4. Structure according to claim 1, wherein means is provided for driving the endless belt type conveyer and the rotatable conveyer at different speeds.

5. Structure according to claim 2, wherein tension springs are provided for counterbalancing the weight of the receiving portion of the table and the associated endless belt conveyer while being raised or lowered.

FREDERICK Z. FOUSE.

REFERENCES CITED

The following references are of record in the file of this patent:

UNITED STATES PATENTS

| Number | Name | Date |
|---|---|---|
| 368,805 | Bascom | Aug. 23, 1887 |
| 973,428 | Henderson | Oct. 18, 1910 |
| 2,152,288 | Seybold | Mar. 28, 1939 |
| 1,846,324 | Finn | Feb. 23, 1932 |
| 1,090,473 | Gullberg et al. | Mar. 17, 1914 |
| 1,684,451 | Lowe | Sept. 18, 1928 |
| 1,263,515 | Diehler et al. | Apr. 23, 1918 |
| 1,258,989 | Craig | Mar. 12, 1918 |
| 387,249 | Nash | Aug. 7, 1888 |
| 148,000 | Swain et al. | Feb. 24, 1874 |

FOREIGN PATENTS

| Number | Country | Date |
|---|---|---|
| 403,711 | Great Britain | Dec. 22, 1933 |

Certificate of Correction

Patent No. 2,421,874. June 10, 1947.

FREDERICK Z. FOUSE

It is hereby certified that errors appear in the printed specification of the above numbered patent requiring correction as follows: Column 11, line 60, claim 1, for the word "end" read *portion*; line 61, for "portion" read *end*; and that the said Letters Patent should be read with these corrections therein that the same may conform to the record of the case in the Patent Office.

Signed and sealed this 2nd day of September, A. D. 1947.

[SEAL]

LESLIE FRAZER,
*First Assistant Commissioner of Patents.*